US012789679B2

(12) United States Patent
Conigliaro et al.

(10) Patent No.: US 12,789,679 B2

(45) Date of Patent: Nov. 10, 2026

(54) COCKPIT FOR A MOTOR VEHICLE AND METHOD FOR THE RECONFIGURATION OF A COCKPIT

(71) Applicant: FERRARI S.P.A., Modena (IT)

(72) Inventors: Vito Conigliaro, Modena (IT); Alessandro Paolo De Paoli, Modena (IT); Thomas Granjard, Modena (IT); Daniel Martin Taylor, Modena (IT)

(73) Assignee: FERRARI S.P.A., Modena (IT)

( * ) Notice: Subject to any disclaimer, the term of this patent is extended or adjusted under 35 U.S.C. 154(b) by 289 days.

(21) Appl. No.: 18/772,574

(22) Filed: Jul. 15, 2024

(65) Prior Publication Data

US 2025/0026251 A1 Jan. 23, 2025

(30) Foreign Application Priority Data

Jul. 20, 2023 (IT) ........................ 102023000015258

(51) Int. Cl.

*B60N 2/30* (2006.01)

*B60N 2/809* (2018.01)

(52) U.S. Cl.

CPC ........... *B60N 2/3025* (2013.01); *B60N 2/809* (2018.02)

(58) Field of Classification Search

CPC ........ B60N 2/3025; B60N 2/30; B60N 2/062; B60N 2/809; B60N 2/99

See application file for complete search history.

(56) References Cited

U.S. PATENT DOCUMENTS

2016/0176318 A1* 6/2016 Poulos .................. B60N 2/062 297/235

2018/0244180 A1* 8/2018 Khalid .................. B60N 2/062

FOREIGN PATENT DOCUMENTS

FR 2890911 A1 3/2007

FR 3108277 A1 9/2021

OTHER PUBLICATIONS

Italian Search Report in IT Application No. 202300015249, mailed Jan. 31, 2024, an English Translation attached hereto (6 pages).

* cited by examiner

*Primary Examiner* — Dany E Akakpo

(74) *Attorney, Agent, or Firm* — Leason Ellis LLP

(57) ABSTRACT

A cockpit for a motor vehicle is described, with a support structure; a first side and a second, third, and fourth side mounted on the support structure in a sliding manner along the first axis and movable between a respective first and second position spaced apart from one another relative to the first axis; the first side and second side are opposite one another with reference to the first axis; the third side is interposed between the first side and the fourth side along the first axis; the fourth side is interposed between the third side and the second side along the first axis; the cockpit is available in a first, two-seater configuration, in which it comprises a first seat laterally delimited by the first side and third side arranged in the respective first positions; and a second seat laterally delimited by the fourth side and second side arranged in the respective first positions; the cockpit is available in a second single-seater configuration, in which it comprises a single third seat laterally delimited by the fourth side arranged in the second position and by the second side arranged in the second position.

14 Claims, 3 Drawing Sheets

COCKPIT FOR A MOTOR VEHICLE AND METHOD FOR THE RECONFIGURATION OF A COCKPIT

CROSS-REFERENCE TO RELATED APPLICATIONS

This patent application claims priority from Italian patent application no. 102023000015258 filed on Jul. 20, 2023, the entire disclosure of which is incorporated herein by reference.

TECHNICAL FIELD

This invention relates to a cockpit for a motor vehicle and a method for reconfiguring the cockpit.

BACKGROUND

Motor vehicles comprise, in a known way:

a passenger compartment defining a body;

multiple wheels;

a steering wheel arranged inside the passenger compartment which can be driven by a driver to steer the front wheels and thus enable the motor vehicle to follow a curved trajectory; and pedals comprising an accelerator and a brake that the driver can activate to increase the drive torque or exert a braking torque on the wheels respectively, so as to control the speed of the motor vehicle.

The passenger compartments of motor vehicles normally intended for use on the road implement the so-called "two-seater" configuration.

In this "two-seater" configuration, the passenger compartment also comprises a pair of front seats intended to be occupied by a driver and a passenger respectively, and arranged next to each other along a transverse direction of the motor vehicle orthogonal to a longitudinal direction defining a normal forward direction of the motor vehicle.

The steering wheel and the pedals are located opposite the driver's seat and are basically arranged in a left or right front corner of the vehicle.

With particular reference to sports motor vehicles, passenger compartments are known that implement the so-called "single-seater" configuration.

In this "single-seater" configuration, the passenger compartment comprises a single front seat arranged in a central position opposite the steering wheel and the pedals or passenger seats arranged to the side and/or set back from the central seat.

There is a need in the sector to provide motor vehicles that enable simple and easy reconfiguration between the above-mentioned "single-seater" and "two-seater" configurations.

SUMMARY

The purpose of this invention is to produce a cockpit, which makes it possible to meet the need mentioned above.

The above-mentioned purpose is achieved with this invention, as it relates to a cockpit according to what is disclosed herein and defined in the claims.

This invention also relates to a method for reconfiguring a cockpit according to what is disclosed herein and defined in the claims.

BRIEF DESCRIPTION OF THE DRAWINGS

In order to better understand this invention, a non-limiting preferred embodiment thereof will now be described by way of example with reference to the accompanying drawings, in which.

DESCRIPTION OF EMBODIMENTS

Figure 1:
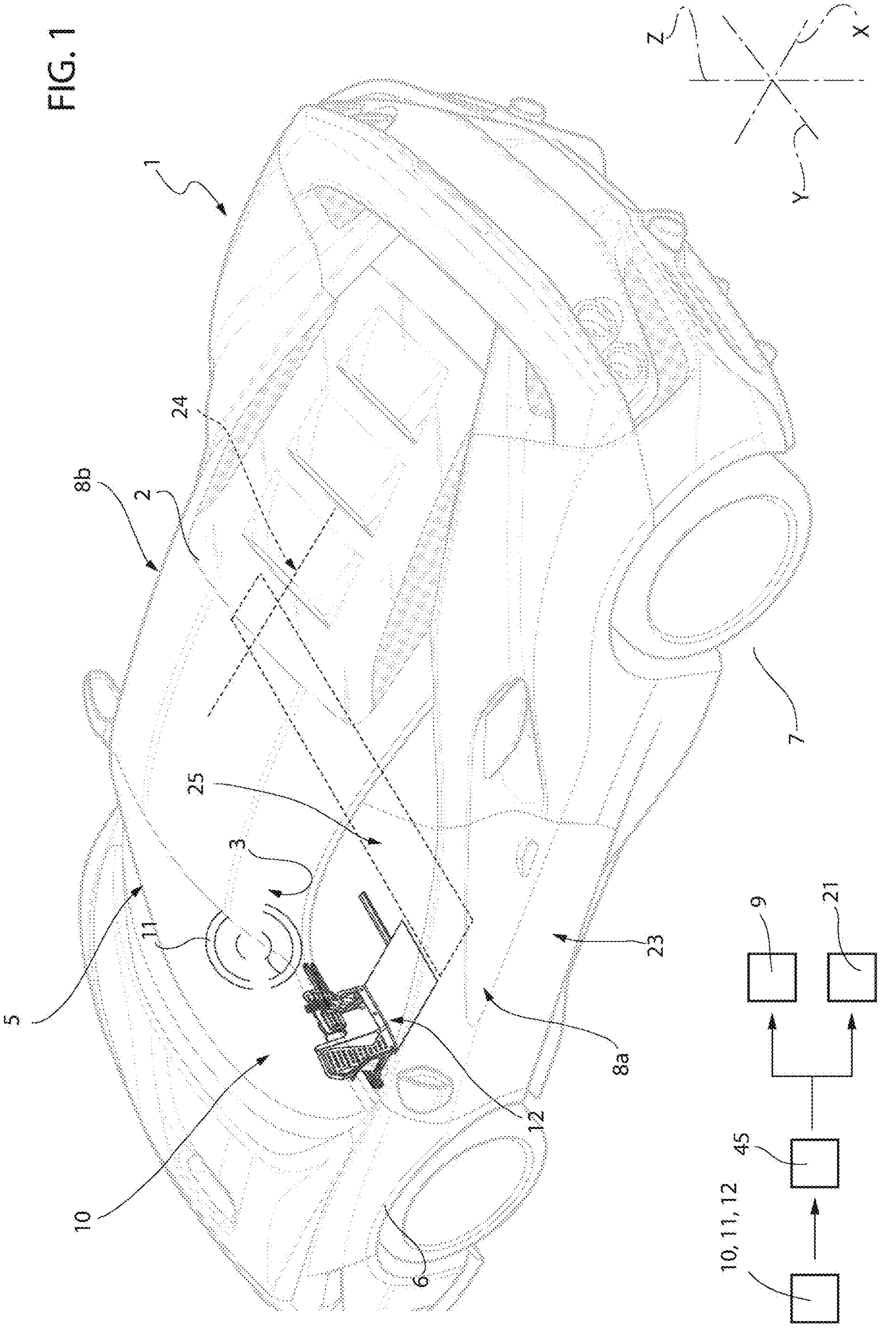
FIG. 1 is a perspective view of a motor vehicle comprising a cockpit produced according to the precepts of this invention with parts removed for clarity.

With reference to FIG. 1, reference number 1 indicates a motor vehicle comprising a body 2 defining a passenger compartment 3.

It should be specified that, below in this description, expressions such as "above", "below", "in front of", "behind" and the like are used with reference to the normal movement of the motor vehicle 1.

It is also possible to define:

a longitudinal axis X integral with the motor vehicle 1, arranged, in use, horizontal and parallel to a normal forward moving direction of the motor vehicle 1;

a transversal axis Y integral with the motor vehicle 1, arranged, in use, horizontal and orthogonal to the axis X; and an axis Z integral with the motor vehicle 1, arranged, in use, vertical and orthogonal to the axes X, Y.

The motor vehicle 1 also comprises (FIG. 1):

a pair of front wheels 6 and a pair of back wheels 7;

a known engine 9 only schematically illustrated in FIG. 1 and operationally connected to the wheels 6 and/or 7 to exert drive torque on the wheels 6 and/or 7; and a brake system 21, also only schematically illustrated, in FIG. 1 that can be driven to exert a braking torque on the wheels 6, 7.

The motor vehicle 1 also comprises (FIG. 1):

a windscreen 5 delimiting the passenger compartment 3 at the front; and a pair of doors **8*a*, 8*b* hinged to the body 2 that can be moved between a closed position wherein they delimit the passenger compartment 3 to the side and prevent entry into/exit from the passenger compartment 3 and an open position wherein they enable entry into/exit from the passenger compartment 3**.

The body 2 also comprises a pair of door sills 23, 24 with longitudinal ends opposite each other. The door sills 23, 24 delimit the passenger compartment 3 and are adjacent to corresponding doors **8*a*, 8*b* when the doors 8*a*, 8*b*** are in the respective closed positions.

The motor vehicle 1 also comprises control members 10 arranged in the passenger compartment 3 that the driver can activate to set a forward trajectory of the motor vehicle 1 with a desired speed.

In a known way, the control members 10 comprise:

a steering wheel 11 arranged inside the passenger compartment 3 that can be driven by the driver; and pedals 12 also arranged inside the passenger compartment 3 that the driver can activate.

The control members 10 are connected to the engine 9, to the brake system 21, and to the wheels 6 and/or 7 implementing a technology known in the sector as "drive by wire".

In this description, the term "drive by wire" mode means that the steering wheel 11 does not have physical or mechanical connections with the wheels 6, 7.

The motor vehicle 1 also comprises a control unit 45 (FIG. 1) programmed to receive, as input, the actions requested at the steering wheel 11 and pedals 12 and to generate, as output, control signals for the engine 9 and the brake system 21.

The passenger compartment 3 houses a front cockpit 25, only schematically illustrated in FIG. 1, in a known way.

Advantageously, the cockpit 25 comprises:

a support structure 29;

a pair of sides 97, 107 supported by the support structure 29 in a fixed manner in relation to the axis Y;

between pairs of sides 100, 110; 98, 108; 99, 109 mounted on the support structure 29 in a sliding manner along the axis Y and each movable between a respective first and second position spaced apart from one another relative to the axis Y;

the sides 97; 107 *e* 100; 110 are opposite each other in relation to the axis Y;

each side 98, 108 is interposed between a respective side 97, 107 and fourth side 99, 109 along the axis Y;

each side 99, 109 is placed between a corresponding side 98, 108 and a corresponding side 100, 110 the axis Y;

the cockpit 25 can be shifted to a two-seater configuration, wherein it comprises:

a seat 26 laterally delimited by the sides 97, 107 and the sides 98, 108 arranged in respective first positions; and a seat 27 laterally delimited by the sides 99, 109 and the sides 100, 110 arranged in respective first positions, and placed alongside the seat 26 parallel to the axis Y;

the cockpit 25 can be selectively arranged in a second, single-seater configuration, wherein it comprises a single seat 28 laterally delimited by the sides 99, 109 arranged in the second position and by the sides 100, 110 arranged in said second position.

More specifically, the support structure 29 comprises:

a frame 35 formed from a seat cushion 36 and a backrest 37 having corresponding upper and lower end edges 38, 39 next to each other; and a pair of headrests 50, 51 projecting overhanging above an upper end edge of the seat cushion 36 opposite the end edge 38.

The greatest dimension of the seat cushion 36 and the backrest 37 is parallel to the axis Y.

The support structure 29 also wholly defines the seats 26, 27 in the first, two-seater configuration of the cockpit 25 and the seat 28 in the second, single-seater configuration of the cockpit 25.

Figure 2:
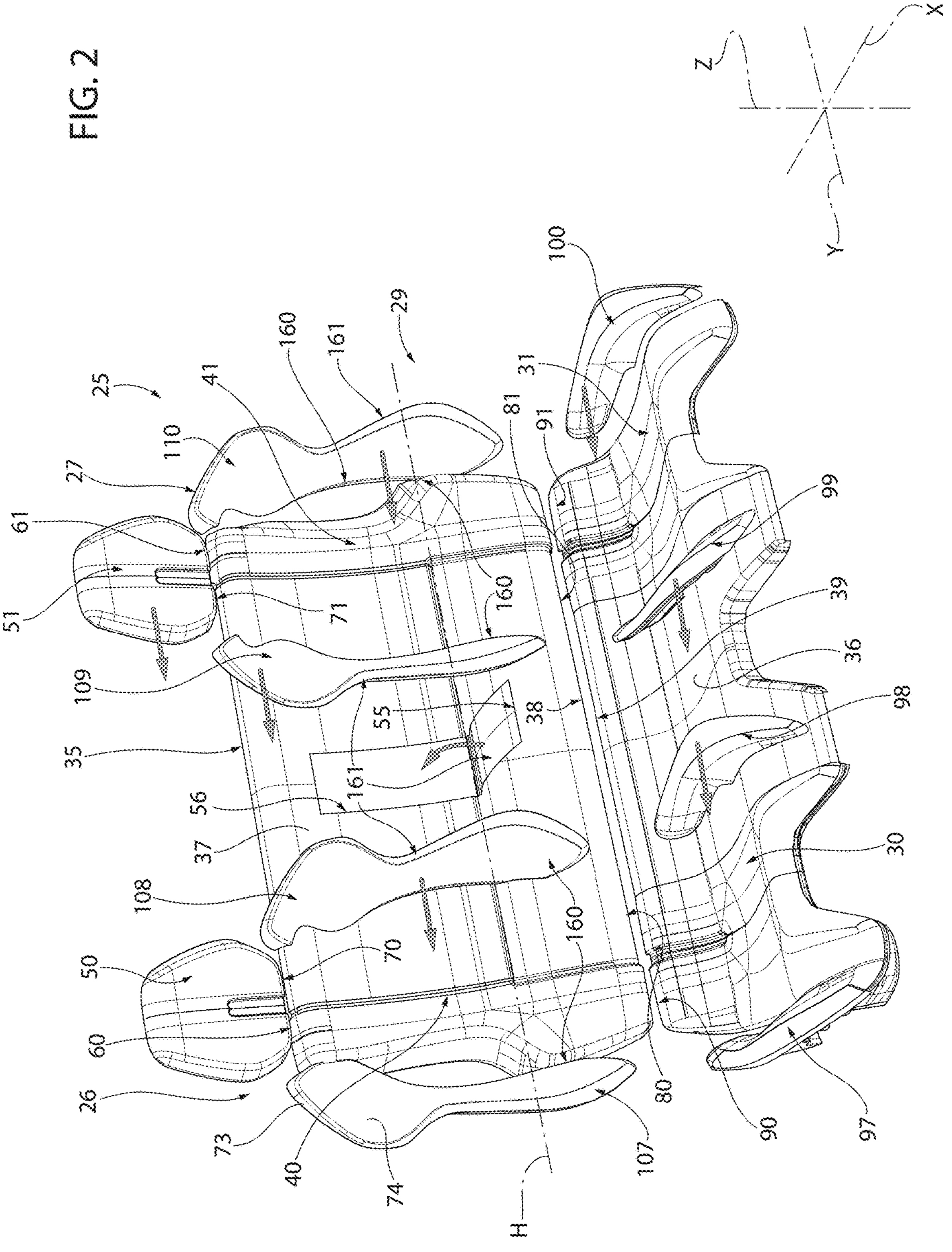
FIG. 2 is a perspective view on a very enlarged scale of the cockpit in FIG. 1, with parts removed for clarity and in a first, "two-seater" operating configuration.

With reference to the first, "two-seater" configuration illustrated in FIG. 2, the seats 26, 27 each comprise:

a respective seat cushion 30, 31;

a respective backrest 40, 41; and a respective headrest 50, 51.

Each backrest 40, 41 comprises, in particular:

a corresponding upper edge 60, 61 extended along the axis Y and connected to a lower edge 70, 71 of the corresponding headrest 50, 51; and a corresponding lower edge 80, 81 extended along the axis Y and connected to a rear and upper edge 90, 91 of the corresponding seat cushion 30, 31.

The sides 97, 98; 99, 100 project overhanging above the seat cushion 36 of the support structure 29.

The sides 107, 108; 109, 110 project overhanging in front of the backrest 37 of the support structure 29.

The sides 97, 98; 99, 100 are arranged on corresponding opposite sides of the corresponding seat cushion 30; 31.

The sides 107, 108; 109, 110 are arranged on respective opposite sides of the corresponding backrest 40, 41.

In particular, each side 97, 98; 99, 100; 107, 108; 109, 110 comprises (FIG. 2):

a corresponding edge 160 fixed to the corresponding seat cushion 30; 31 or backrest 40; 41; and a corresponding free edge 161 opposite the corresponding edge 160.

Figure 3:
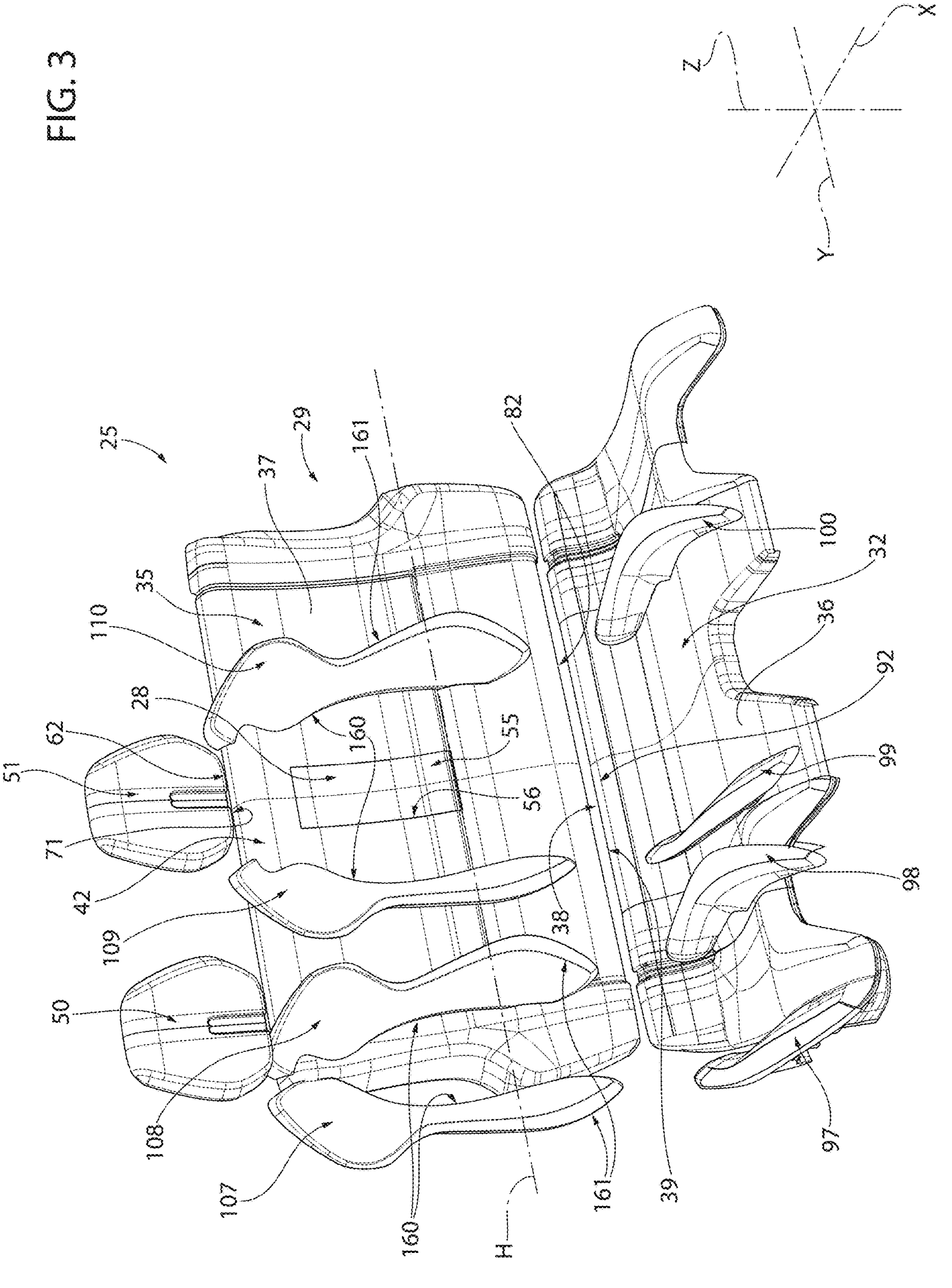
FIG. 3 is a perspective view on a very enlarged scale of the cockpit in FIG. 1, with parts removed for clarity and in a second, "single-seater" operating configuration.

The sides 107, 108; 109, 110 each comprise a support 73 and a cushion 74 supported by the support 70 illustrated in FIG. 3.

The seat 26 is arranged on the side of the door sill 23 and the other seat 24 is arranged on the side of the other door sill 24.

The seat 27 is intended to be occupied by the driver and the other seat 26 is intended to be occupied by the passenger.

More precisely, the seat 26 is interposed along the axis Y between the door sill 23 and the seat 27.

The seat 27 is interposed along the axis Y between the seat 26 and the door sill 24.

The sides 97, 98; 99; 100; 107, 108; 109, 110 are arranged so that they diverge from each other, moving from the respective edges 160 to the corresponding edges 161 so as to enable easy access for the driver and passenger, respectively, to the respective seats 27, 26.

The sides 98, 99; 108, 109 are arranged so that they converge with each other, moving from the respective edges 160 to the corresponding edges 161.

The headrest 50 is mounted in a fixed manner on the seat cushion 36 with reference to the axis Y.

The headrest 51 is mounted on the seat cushion 36 so that it can move between:

a respective first position (FIG. 2) assumed when the cockpit 25 is in the first, two-seater configuration in it is arranged above the respective backrest 41; and a respective second position (FIG. 3) assumed when the cockpit 25 is in the second, single-seater configuration wherein it is arranged above the respective backrest 42.

More specifically, in the second, "single-seater" configuration of the cockpit 25, the seat 28 is arranged equally distant from the door sills 23, 24 along the axis Y, and is intended to be occupied by the driver.

The seat cushion 36 defines the seat cushion 30, 31, 32 and the backrest 37 defines the backrests 40, 41, 42.

The backrest 42 comprises, in particular:

a corresponding upper edge 62 extended along the axis Y and arranged at the lower edge 71 of the headrest 51; and a corresponding lower edge 82 extended along the axis Y and arranged at a rear and upper edge 92 of the seat cushion 32.

The cockpit 25 comprises, in addition, an armrest 55 hinged to the seat cushion 36 of the support structure 29.

The armrest 55 can be moved between:

an open position (illustrated in FIG. 2) assumed when the cockpit 25 is in the first, two-seater position, wherein it projects in front of the frame 35 and extends parallel to the axis X in a position interposed parallel to the axis Y between the seats 26, 27; and a closed position (illustrated in FIG. 3) assumed when the cockpit 25 is in the second, single-seater configuration, wherein it is housed in a seat 56 defined by the seat cushion 32 and extends transversely to the axes X, Y.

In particular, the armrest 55 is hinged to the seat cushion 32 around an axis H parallel to the axis Y so as it can be rotated parallel to the axis Y between the above-mentioned open and closed positions.

In the closed position, the armrest 55 is level with the remaining part of the seat cushion 32.

The transition of the cockpit 25 from the first, two-seater configuration to the second, single-seater configuration occurs via:

the rotation of the armrest 55 from the open position to the closed position around the axis H;

the translation of the sides 98, 108 of the same distance L parallel to the axis Y from the respective first positions towards the corresponding second positions;

the simultaneous translation of the headrest 51 and the sides 99, 109 of the same distance L parallel to the axis Y from the respective first position towards the corresponding second position; and the translation of the sides 100, 110 of the same distance L parallel to the axis Y from the respective first position towards the respective second position.

In the example illustrated, the translation of the headrest 51 from the corresponding first position to the corresponding second position occurs simultaneously to the translation of the sides 98, 99 100; 108, 109, 110 parallel to the axis Y from the respective first positions towards the corresponding second positions.

The transition of the cockpit 25 from the first to the second configuration, and vice versa, also occurs manually or by driving an actuator (not illustrated).

In a way not described in detail since not necessary for this invention, the pedals 12 and the steering wheel 11 can be moved along the axis Y to encourage the transformation of the motor vehicle 1 between the first and second configuration.

In particular, the pedals 12 and the steering wheel 11 may be moved parallel to the axis Y between:

a third position (FIG. 1) assumed when the cockpit 25 is in the first, "two-seater" configuration and wherein they face the seat 27; and a fourth position (not illustrated) assumed when the cockpit 25 is in the second, "single-seater" configuration and wherein they face the seat 28.

The pedals 12 and the steering wheel 11 are arranged adjacent to the door sill 23 when they are arranged in the third position. In this third position, a first distance between the pedals 12 and the steering wheel 11, and the door sill 23 is less than a second distance between the pedals 12 and the steering wheel 11, and the door sill 24. The above-mentioned first and second distance are measured along the axis Y.

The pedals 12 and the steering wheel 11 are arranged in a position midway between the door sills 23, 24 when they are arranged in the fourth position. In this fourth position, the pedals 12 and the steering wheel 11 are equally spaced apart from the door sills 23, 24 along the axis Y.

The operation of the cockpit 25 of the motor vehicle 1 is described starting from a condition wherein the cockpit 25 is in the first, "two-seater" configuration.

In this first, "two-seater" configuration, the seats 27, 26 are arranged in respective first positions and are intended to be occupied by the driver and the passenger respectively.

The seat 26 is interposed between the door sill 23 and the seat 27 and the seat 27 is interposed between the seat 26 and the door sill 24 parallel to the axis Y.

More specifically, the seat 26 comprises the seat cushion 30, the backrest 40, and the headrest 50.

The seat 26 is also delimited laterally on corresponding opposite sides by the side 97 and the side 98 arranged in the first position, and by the sides 107, 108 also arranged in the corresponding first positions.

The seat 27 comprises the seat cushion 31, the backrest 41, and the headrest 50 arranged in the respective first position.

The seat 27 is also delimited laterally on corresponding opposite sides by the sides 99, 100 and 109, 110 arranged in the respective first positions.

The armrest 55 is arranged in the open position wherein it is extended parallel to the axis X and interposed parallel to the axis Y between the backrests 40, 41.

The pedals 11 and the steering wheel 12 are arranged in the third position, wherein they face the seat 27 along the axis X, to enable the driver to guide them.

If one wishes to reconfigure the motor vehicle 1, so as to arrange the cockpit 25 in the second, "single-seater" configuration, it is enough to drive the actuator so as to cause:

the rotation of the armrest 55 from the open position to the closed position around the axis H;

the translation of the sides 98, 108 of the same distance L parallel to the axis Y from the respective first positions towards the corresponding second positions;

the simultaneous translation of the headrest 51 and the sides 99, 109 of the same distance L parallel to the axis Y from the respective first position towards the corresponding second position; and the translation of the headrest 51 of the sides 100, 110 of the same distance L parallel to the axis Y from the respective first position towards the respective second position.

At the end of the transition, the cockpit 25 is in the second configuration wherein:

the seat 28 is in the position midway between the door sills 23, 24 and is delimited on the side by the sides 99, 100; 109, 110 arranged in the respective second positions.

The pedals 11 and the steering wheel 12 are also moved parallel to the axis Y, in a known way not illustrated, from the third position to the fourth position, wherein they face the seat 28 along the axis X, to enable the driver to guide them.

Irrespective of the fact that the cockpit 25 is in the first "two-seater" configuration, or in the second "single-seater" configuration, the control members 10 control the engine 9, the wheels 6, 7, and the brake system 21 implementing a technology known in the sector as "drive by wire".

The advantages enabled by this invention will be apparent from an examination thereof.

In particular, the cockpit 25 can be moved between the first, "two-seater" configuration wherein it defines the seat 27 for the driver and the seat 26 for the passenger next to each other parallel to the axis Y, and the second, "single-seater" configuration wherein it defines only the seat 28 for the driver, simply by translating, parallel to the axis Y, the sides 98, 99, 100; 108, 109, 110 and the headrest 51 from the respective first positions to the respective second positions and rotating the armrest 55 from the open position to the closed position.

In this way, the motor vehicle 1 can be quickly and simply made more suitable for road use when the cockpit 25 assumes the first, "two-seater" configuration or sports use wherein the cockpit 25 assumes the second, "single-seater" configuration.

Finally, it is clear that changes may be made to the cockpit 25 and to the reconfiguration method implemented according to this invention, and variations produced thereto that, in any case, do not depart from the scope of protection defined by the claims.

In particular, in the first, "two-seater" configuration, the seat 27 for the driver could be arranged next to the door sill 24 and the seat 26 for the passenger could be arranged next to the other door sill 23, thus implementing a right-hand drive mode in the motor vehicle 1.

In this case, the sides 100, 110 would be fixed in relation to the support structure 29 and the sides 97, 107; 98, 108; 99, 109 would be mounted on the support structure 29 so they can slide along the axis Y to and from the sides 100, 110 to transition the cockpit 25 between the first and second configuration.

The cockpit could comprise just the sides 97, 98, 99, 100 or just the sides 107, 108, 109, 110.

The invention claimed is:

1. A cockpit for a motor vehicle comprising:

a support structure;

a first side supported by said support structure; and a second, third and fourth side mounted on said support structure in a sliding manner along a first axis and each movable between a respective first and second position spaced apart from one another relative to said first axis;

said first side and said second side being opposite one another with reference to said first axis;

said third side being interposed between said first side and said fourth side along said first axis;

said fourth side being interposed between said third side and said second side along said first axis;

said cockpit being available in a first two-seater configuration, wherein it comprises:

a first seat laterally delimited by said first side and by said third side arranged in the respective first positions; and a second seat laterally delimited by said fourth side and by said second side arranged in the respective first positions;

said first and second seats being next to one another parallel to said first axis;

said cockpit being available in a second single-seater configuration, wherein said cockpit comprises one single third seat laterally delimited by said first side arranged in said second position and by said second side arranged in said second position.

2. The cockpit according to claim 1, wherein said first side is mounted in a fixed manner relative to said support structure with reference to said first axis, and in that said second side, said third side and said fourth side are arranged in the respective first positions at respective first distances from said first side along said first axis and in the respective second positions at respective second distances, which are smaller than said first distances, from said first side along said first axis.

3. The cockpit according to claim 1, wherein said support structure defines:

a first seat cushion and a first backrest of said first seat;

a second seat cushion and a second backrest of said second seat; and a third seat cushion and a third backrest of said second seat;

said third seat cushion being interposed, along said first axis, between said first seat cushion and said second seat cushion;

said third backrest being interposed, along said first axis, between said first backrest and said second backrest.

4. The cockpit according to claim 1, further comprising an armrest, which is articulated on said support structure and is movable between:

an open position assumed when said cockpit is in said first two-seater configuration and wherein said armrest itprojects from said support structure in a position interposed between said first and second seats; and a closed position assumed when said cockpit is in said second single-seater configuration and wherein said armrest it is housed in a relative seat of said support structure arranged in the area of said third seat.

5. The cockpit according to claim 1, wherein said first seat comprises a first headrest, which is fixed relative to said support structure;

said support structure comprising, in turn:

a second head rest supported by said support structure in a movable manner between a third position assumed in said first configuration and a fourth position assumed in said second configuration along said first axis from and to the first headrest;

said second headrest being arranged at a first distance from said headrest in said third position and at a second distance from said first headrest in said fourth position; said second distance being smaller than said first distance;

said first seat comprising said first headrest;

said second seat comprising said second headrest arranged in said third position and said third seat comprising said second headrest arranged in said fourth position.

6. The cockpit according to claim 1, wherein said first side, said second side, said third side and said fourth side each comprise:

a first edge constrained to said support structure; and a second edge opposite said first edge;

said first side and said third side diverging from one another, moving from the respective first edge to the corresponding second edge;

said fourth side and said second side diverging from one another, moving from the respective first edge to the corresponding second edge.

7. The cockpit according to claim 3, wherein said first side and said third side laterally delimit said first backrest and said fourth side and said second side laterally delimit said second backrest in the respective first positions;

said third side and said fourth side laterally delimiting said third backrest in the respective second positions;

said cockpit further comprising:

a further first side supported by said support structure in a fixed position relative to said first axis;

a further second side, a further third side and a further fourth side, each movable between respective further first and second positions along said first axis;

said further third side being interposed between said further first side and said further fourth side along said first axis;

said further fourth side being interposed between said further third side and said further second side along said first axis;

said further first side and said further third side laterally delimiting said first seat cushion and said further fourth side and said further second side laterally delimiting said second seat cushion in the respective further first positions;

said further fourth side and said further second side laterally delimiting said third seat cushion in the respective further second positions.

8. A motor vehicle comprising:

a passenger compartment defining a second axis arranged, in use, parallel to a forward moving direction of the motor vehicle and orthogonal said first axis;

a plurality of driving members which are housed inside said passenger compartment and can be operated by a driver in order to control a the-trajectory and a the speed of said motor vehicle;

at least one control member connected to at least one driving member through a drive by wire mode; and said cockpit according to claim 1.

9. A method for the configuration of a cockpit for a motor vehicle said cockpit comprising:

a support structure;

a first side supported by said support structure; and a second, third and fourth side mounted on said support structure in a sliding manner along a first axis and each movable between a respective first and second position spaced apart from one another relative to said first axis;

said first side and said second side being opposite one another with reference to said first axis;

said third side being interposed between said first side and said fourth side along said first axis;

said fourth side being interposed between said third side and said second side along said first axis;

said method comprising the steps of:

i) arranging said cockpit to a first two-seater configuration, wherein said cockpit it comprises:

a first seat laterally delimited by said first side and by said third side arranged in respective first positions; and a second seat laterally delimited by said fourth side and by said second side arranged in respective first positions;

said first and second seats being next to one another parallel to said first axis;

said method further comprising the step ii) of arranging said cockpit to a second single-seater configuration, wherein said cockpit it comprises one single third seat laterally delimited by said fourth side and by said second side arranged in the respective second positions.

10. The method according to claim 9, wherein said step ii) comprises the step iii) of moving said second side, said third side and said fourth side closer to said first side parallel to said first axis.

11. The method according to claim 9, further comprising the step iv) of moving an armrest articulated on said support structure between:

an open position assumed when said cockpit is in said first two-seater configuration and wherein said armrest it-projects from said support structure in a position interposed between said first and second seats; and a closed position assumed when said cockpit is in said second single-seater configuration and wherein said armrest it is housed in a relative seat of said support structure arranged in the area of said third seat.

12. The method according to claim 9, wherein said step iii) comprises the steps of:

v) moving said third side closer to said first side;

vi) moving said fourth side closer to said first side;

vii) moving said second side closer to said first side;

said steps v), vi) and vii) being carried out, time-wise, in sequence.

13. The method according to claim 12, further comprising the step viii) of moving a second headrest supported by said support structure in a movable manner along said first axis from and to a first headrest fixed to said support structure between a first position assumed in said first configuration of said cockpit and a fourth position assumed in said second configuration of said cockpit;

said second headrest being arranged at a first distance from said first headrest in said third position and at a second distance from said first headrest in said fourth position;

said second distance being smaller than said first distance;

said first seat comprising said first headrest;

said second seat comprising said second headrest arranged in said third position and said third seat comprising said second headrest arranged in said fourth position;

said step viii) being carried out simultaneously with said step vi).

14. The method according to claim 9, wherein said support structure defines:

a first seat cushion and a first backrest of said first seat;

a second seat cushion and a second backrest of said second seat; and a third seat cushion and a third backrest of said second seat;

said third seat cushion being interposed, along said first axis, between said first seat cushion and said second seat cushion;

said third backrest being interposed, along said first axis, between said first backrest and said second backrest;

said third side and said fourth side laterally delimiting said third backrest in the respective second positions;

said cockpit further comprising:

a further first side supported by said support structure in a fixed position relative to said first axis;

a further second side, a further third side and a further fourth side, each movable between respective further first and second positions along said first axis;

said further third side being interposed between said first side and said fourth side along said first axis;

said further fourth side being interposed between said third side and said second side along said first axis;

said further first side and said further third side laterally delimiting said first seat cushion and said further fourth side and said further second side laterally delimiting said second seat cushion in the respective further first positions;

said further fourth side and said further second side laterally delimiting said third seat cushion in the respective further second positions;

said step ii) comprises the further step vi) of moving said further second side, said further third side and said further fourth side to said further first side parallel to said first axis.

* * * * *